United States Patent [19]

Liem

[11] 4,377,439
[45] Mar. 22, 1983

[54] PULP MILL RECOVERY
[75] Inventor: Albert J. Liem, Roxboro, Canada
[73] Assignee: Domtar Inc., Montreal, Canada
[21] Appl. No.: 208,666
[22] Filed: Nov. 20, 1980
[51] Int. Cl.$^3$ .............................................. D21C 11/12
[52] U.S. Cl. ................... 162/30.1; 122/7 C; 162/30.11; 162/47; 423/207; 423/DIG. 3; 432/15
[58] Field of Search ...................... 162/30.1, 30.11, 36, 162/47; 423/207; 110/238, 245; 122/4 D, 7 C; 432/15; 34/10

[56] References Cited

U.S. PATENT DOCUMENTS

| | | | |
|---|---|---|---|
| 3,523,864 | 8/1970 | Osterman et al. | 162/30.11 |
| 3,657,064 | 4/1972 | Shick | 162/30.1 |
| 4,011,129 | 3/1977 | Tomlinson | 162/30.1 |
| 4,154,643 | 5/1979 | Cook et al. | 162/30.1 |
| 4,244,779 | 1/1981 | Nieminen et al. | 162/30.1 |
| 4,312,702 | 1/1982 | Tomlinson | 162/30.1 |

FOREIGN PATENT DOCUMENTS 958506 12/1974 Canada .

*Primary Examiner*—Peter Chin

[57]     ABSTRACT

A recovery system for residual liquor from a pulp mill, utilizing a fluidized bed to burn the organic material in the residual liquor and generate heat which may be recovered. Heat preferably from the flue gases is used to dry residual liquor sprayed to pellets extracted from the bed, thereby to provide pellets coated with dried residual liquor. The so coated and dried pellets are then reinjected into the bed and the organic material in the dried residual liquor is burned to generate the heat recovered from the bed.

If the residual liquor is from a kraft mill sulfur compounds are in the form of sulfate and must be reduced to sulfide and a reducing stage will also be provided either in the reducing zone in existing conventional kraft system (if capacity is available) or in a separate reducing zone and some of the pellets from the bed may be directed to the reducing zone together with some of the pellets coated with dried residual liquor. Heat may be supplied to the reducing zone via an auxiliary fuel and reducing gases may also be supplied but preferably the ratio of carbon to pellets or the required temperature in the reducing zone will be obtained by the ratioing of caated and uncaated pellet fed to the reducing zone and the reduced material is withdrawn therefrom while the gases from the reducing zone are directed to the bed to complete their oxidation and generated heat.

5 Claims, 2 Drawing Figures

PULP MILL RECOVERY

FIELD OF THE INVENTION

The present invention relates to a pulp mill recovery system. More specifically the present invention relates to a fluidized bed combustion system for recovery of chemical from pulp mill residual liquors. It may be adapted to a kraft liquor recovery system.

BACKGROUND OF THE INVENTION

It is customary in the Pulp & Paper Industry when producing chemical pulp to burn the used or residual liquor in a chemical and heat recovery unit. In a conventional kraft process chemical is recovered by injecting black liquor at a concentration of about 65% solids into the furnace and burning the organic material in the liquor in two stages. As the liquor enters the furnace, it is rapidly dried and forms a char bed above the hearth. This char bed burns under reducing conditions at a temperature of 1300°–1700° F. and the recovered chemicals are drained from the bed as a smelt and are discharged from the furnace. In the second stage of burning further oxygen is added to burn the gases generated in the char bed at a higher location in the furnace. Temperature in the second stage is generally about 2000°–2100° F. and the furnace is provided with suitable heat exchange means to recover heat and generate steam, thereby to supply the major portion of the steam requirements of the mill.

Such furnaces are susceptible to major safety problems as a result of serious explosions which occur when significant quantities of water contact the smelt. Although major efforts have been made to avoid such accidental contact, failure of a tube in the water wall or in the boiler section of the furnace, for whatever reason, has resulted in explosions.

It is also known to recover chemicals from residual liquors in the Pulp & Paper Industry using fluidized bed combustion units. In this case, the recovered inorganic chemicals are in the form of pellets and since the pellets are solid rather than molten as in the smelting furnace, the explosion hazard is eliminated. However, combustion must be carried out at a temperature of less than about 1300° F. (for kraft liquor) to prevent the pellets from melting and aglomerating and defluidizing the bed. Generally, in existing units the low temperature is maintained by feeding a relatively dilute liquor to the bed so that the excess heat that could be used to generate steam is used in evaporating the extra liquid accompanying the solids i.e. the dilute liquor fed to the fluidized bed has a concentration in the range of 30-40% as compared to the 65% concentration in the conventional kraft furnace.

It is current practice in at least one kraft mill to burn a kraft liquor in a fluidized bed, thereby to generate pellets composed primarily of sodium carbonate and sodium sulfate and to inject these pellets onto the char bed of a conventional kraft recovery boiler thereby to reduce the pellets and increase the production of smelt i.e. to increase the recovery capacity of the mill by adding an oxidation stage to the recovery system. Such an arrangement is described in detail in U.S. Pat. No. 4,011,129 issued Mar. 8, 1977 to Tomlinson.

Fluidized bed recovery systems, whether used for kraft recovery or semi-chemical recovery have not normally been provided with heat exchange means, and thus, little, if any, heat has been recovered from these fluidized beds other than through waste-heat boilers or boiler sections provided in the freeboard area above the fluidized bed. However, it is well known in the burning of coal in fluidized beds to incorporate within the bed heat exchange means for the production of steam and it has also been proposed in certain applications to incorporate such heat exchange means in other fluidized bed chemical processes.

The cost of energy has increased significantly over the past few years and it has now become economically sound to recover heat from the burning of such residual liquor and it is desirable to maximize such heat recovery. Clearly the feeding of dilute residual liquors of 30-40% consistency reduces significantly the amount of heat that may be extracted from the fluidized bed. Similarly, the feeding of concentrated liquors of about 65% as used in the conventional kraft recovery furnace still incorporates a significant amount of water that must be evaporated in the furnace thus reducing the heat recoverable as steam. However, the 65% solids is about as high a solid content as one may obtain and still properly feed the concentrated liquor to the furnace.

It has also been proposed to concentrate residual liquor in a ventrui type scrubber fed with flue gases directly from the fluidized bed and to separate this concentrated liquor, mix it with ground solids obtained by grinding pellets extracted from the fluidized bed to form a slurry and to feed the resultant slurry back to the bed. The degree of fineness of the ground solids is used to obtain the desired particle size distribution in the bed. Such an arrangement is shown in Canadian Pat. No. 958,506 issued Dec. 3, 1974 to Heath.

BRIEF DESCRIPTION OF THE INVENTION

It is an object of the present invention to optimize the heat recovery potential of a fluidized bed by feeding substantially dry residual liquor to the fluid bed as a coating on the pellets forming the bed.

Broadly the present invention relates to a system for recovery of heat and chemical from residual liquors from pulp mills comprising providing a fluidized bed of pellets of inorganic chemical derived from the residual liquor from the pulp mill, extracting heat from said bed, extracting pellets from said bed, injecting residual liquor and at least a portion of said extracted pellets into a dryer, thereby to coat said pellets injected into the dryer with residual liquor and to dry said liquor on the surface of said pellets injected to said dryer and provide pellets coated with dry residual liquor, removing said pellets coated with dried liquor from said dryer, injecting said coated pellets into said fluidized bed, oxidizing organic material in said dried liquor coating said pellets in said bed, thereby to generate heat and extracting at least some of said heat from the bed to prevent the pellets in the bed from fusing together.

If used for kraft recovery, a portion of the pellets extracted from the bed together with a portion of the coated pellets extracted from the dryer may be fed to a reduction zone wherein the pellets are reduced at elevated temperatures, preferably the gases generated in this reduction zone are fed as part of the fluidizing gases into said fluidized bed where they are oxidized to generate heat.

BRIEF DESCRIPTION OF THE DRAWINGS

Further features, objects and advantages will be evident from the following detailed description of the preferred embodiments of the present invention, taken in conjunction with the accompanying drawings in which:

DESCRIPTION OF THE PREFERRED EMBODIMENTS

Figure 1:
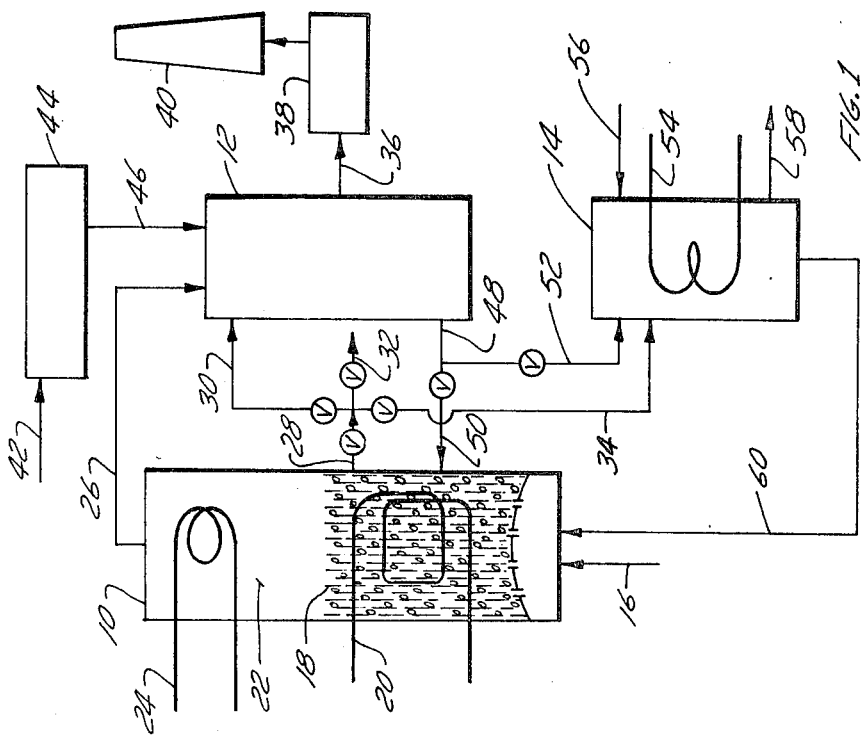

FIG. 1 is a schematic illustration of one form of the present invention.

Figure 2:
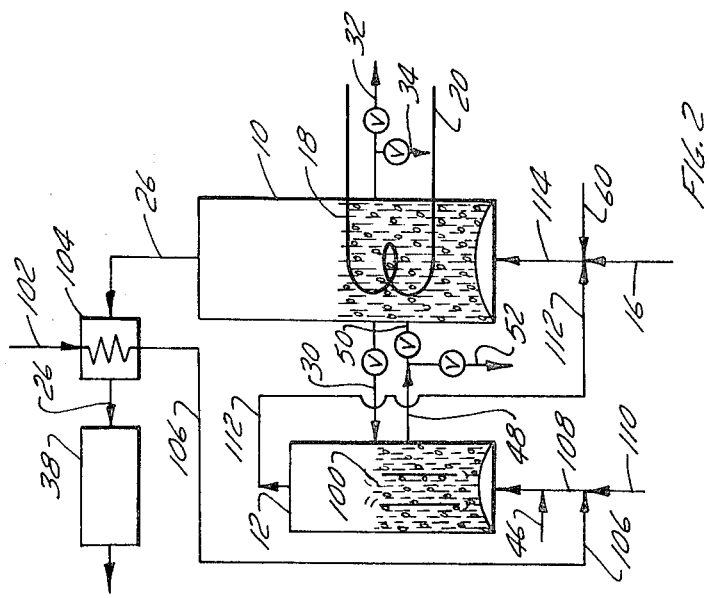

FIG. 2 is a schematic illustration of another arrangement of the present invention.

As shown in FIG. 1, the present invention includes fluidized bed oxidation unit 10 and a coater dryer 12 and, in the kraft recovery embodiment, a reducing zone 14.

The fluidized bed unit 10 is fed with a fluidizing gas via line 16 to fluidize the pellets in forming the fluidized bed 18. The bed 18 is provided with heat extraction means 20 and the free board area 22 of the unit 10 is provided with a further heat extractor 24. Flue gases are passed from the fluidized bed 10 via line 26 into the dryer 12 while pellets are withdrawn from the bed via line 28 and fed via line 30 to the dryer 12. A portion of these pellets may be bled from the system via line 32 and in the kraft recovery system some of the pellets will be directed via line 34 to the reduction zone 14, as will be described in more detail hereinbelow. It will be apparent that by directing pellets from the bed 18 directly into the drier 12 the pellets will be hot and supply a portion of the heat necessary to dry the liquor.

The flue gas is passed from the dryer 12 via line 36 to a suitable particulate removal or other gas cleaning equipment 38 and finally to the stack 40.

The liquor from the pulp mill enters the system via line 42 and preferably pass through a multiple effect evaporators 44 so that a concentrated liquor leaves the evaporators 44 via line 46 and enters the dryer 12.

In the dryer 12 the hot flue gases and the hot pellets entering via the lines 26 and 30 respectively are contacted by the concentrated liquor entering via line 46. This liquor tends to coat the pellets entering via line 30 and be dried by the heat available from both the pellets and the flue gases (further heat may be added if required). The resultant dried pellets with a coating of dried liquor thereon leave the dryer via line 48 and are fed via line 50 to the fluidized bed 18 and function as the fuel for the bed or in the kraft system a portion of these pellets may be fed via line 52 to the reduction unit 14 or to the reduction stage in a convention kraft furnace eg as taught in the said Tomlinson patent.

Pellets with the dried liquor thereon are returned to the bed 14 and the organics in this dried liquor burned in the bed. Since there is no, or very little, water accompanying the dried liquor into the bed, the heat available from the bed is significantly higher than when the concentrated liquor (65% concentration) is burned in the conventional kraft furnace or the 30–40% concentration liquor as normally burned in the fluidized bed. Suitable heat transfer means 20 will absorb this heat and maintain the temperature of the bed at the required temperature below the fusion point of the pellets to ensure that the bed does not aglomerate into a solid mass.

The control of bed temperature to insure proper operation may be obtained by any available well known method. Preferably the bed temperature will be preset and the amount of heat extracted adjusted accordingly. (For example if the heat exchanger 20 is a superheater by adding water to the steam entring or at some point in its passage through the exchanger 20 to vary the amount of heat absorbed.)

If kraft liquor is being recovered, the pellets bled via line 32 together with an appropriate amount of coated pellets from the coated drier 12 may be fed directly onto the char bed of the conventional kraft recovery boiler in the mill for example as described above with respect to the Tomlinson patent. In this case the particle size may be adjusted to optimize reduction efficiency. If the capacity of the existing recovery boiler is already being used, or if the unit is to be incorporated in a pulp mill wherein there is no existing kraft recovery boiler, then a separate reduction stage as indicated at 14 may be provided for reducing the inorganic chemicals from the residual liquor to form sodium sulfide and sodium carbonate. This is accomplished by feeding some of the coated pellets via line 52 into the reduction unit 14 and by feeding some of the pellets leaving the fluidized bed via line 28 directly into the reduction unit so that the inorganic chemicals of these pellets may be reduced. The organic material accompanying (primary coated on) the pellets entering via line 52 functions to generate at least some of the heat necessary for the reduction reaction. Other heat may be added if required to the reduction unit via the heat exchanger generally indicated at 54 and suitable reducing gases may be introduced into the reduction unit 14 through the line 56 and the reduced material is removed via the line 58, while the gases generated in reducing unit 14 are carried in line 60 and added to the fluidizing air entering via line 16 to be oxidized in the bed 18. Suitable blower means may be provided if necessary.

Referring now to FIG. 2 like parts have been indicated by the same reference numerals as used in the description of FIG. 1.

As shown in FIG. 2, the fluidized bed unit 10 has the heat extraction means 20 positioned within the bed 18, pellets from the bed 18 are directed by via line 30 into the dryer 12, which in this case is illustrated in the form of a spouting bed dryer having a bed as indicated at 100. Gases enter the system via line 102 and preferably are preheated in an indirect heat exchanger or the like 104 by extracting heat from the flue gases in line 26 before the flue gases proceed to particulate removal or other gas cleaning equipment 38. Heated gases (air) pass from heat exchanger 104 through line 106 and are injected into the bottom of the spouting bed dryer 12 via line 108 and may be supplemented with other heated air or the like entering the system via line 110.

Black liquor in line 46 is sprayed into the spouting bed 100 thereby to coat the pellets forming i.e. the pellets extracted from the bed 18 and injected into the bed 100 via line 30.

The black liquor sprayed in via line 46 coats the pellets and is dried to form an adherent coating on the pellets by the hot air entering through line 108. This air in line 108 functions both to dry the residual liquor entering and to form the spouting bed 100. The pellets with a dried coating of residual liquor thereon are removed from the bed 100 and pass through line 48 and are reinjected into the bed 18 via line 50. If desired a portion of these coated pellets may be directed via line 52 to a reducing zone or the like not shown but equivalent to the reducing zone 14, if such a zone is necessary.

The gases leaving the dryer 12 pass via line 112 and are injected via line 114 into the fluidized bed 10 to fluidize bed 18 and provide the combustion air for burning of the coating covering the pellets entering the bed 18 via line 50. If necessary, further oxidizing and fluidizing air may be introduced to the system via line 16 and gasses from the reducing zone may be introduced into the bed 18 via line 60 as described hereinabove with respect to the reducing zone 14.

It will be apparent that pellets may be extracted from the bed 18 via line 32, and may, if desired, be directed to a reducing zone 14 via line 34 substantially as described hereinabove with respect to the reducing zone 14 in FIG. 1.

The FIG. 2 arrangement carries all of the gases from the dryer into the fluidized bed 18, thereby minimizing emission from the system.

It will be apparent that the type of coater dryer used to dry the coating on the surface of the pellets is important to ensure that the pellets are coated and the residual liquor dried without adhering to the walls of the dryer. It is preferred to use a spouting bed coater dryer in both the FIG. 1 or FIG. 2 arrangements but any suitable coater dryer may be used such as spray dryers or fluidized bed driers provided care is taken to minimize the fouling of the dryer system by the black liquor as it is dried and minimize abrasion of the coating from the surface of the pellets. It has been found easier to apply heavier coatings in a spouting bed coater drier than in a fluidized bed coater drier.

Modifications may be made without departing from the spirit of the invention as defined in the appended claims.

I claim:

1. A method for the recovery of heat and chemical from residual liquor from a pulp mill comprising; forming a fluidized bed of pellets of inorganic chemical derived from said residual liquor, extracting pellets from said bed and injecting at least a portion of said extracted pellets into a coater dryer, injecting residual liquor from said pulp mill into said dryer, coating said pellets injected into said dryer with said residual liquor and drying said residual liquor on the surface of said pellets injected into said dryer, thereby to form pellets coated with dry residual liquor removing said pellets coated with dried residual liquor from said dryer, injecting said coated pellets into said fluidized bed, oxidizing organic material in said dried residual liquor coating said pellets in said bed and extracting heat from said bed to maintain said bed at an operating temperature.

2. A method as defined in claim 1 wherein said residual liquor is a kraft residual liquor and said method further comprises directing some of said coated pellets from said dryer into a reducing zone, directing some of said pellets extracted from said bed to said reducing zone, and reducing said pellets in said zone, withdrawing reduced material from said zone.

3. A method as defined in claim 1 wherein heat is supplied to said drier from flue gases derived from said fluid bed.

4. A method as defined in claim 1 wherein said drier is a spouting bed drier.

5. A method as defined in claims 1 or 2 where said pellets injected into said dryer are hot.